ns patent office 2,953,078
Patented Sept. 20, 1960

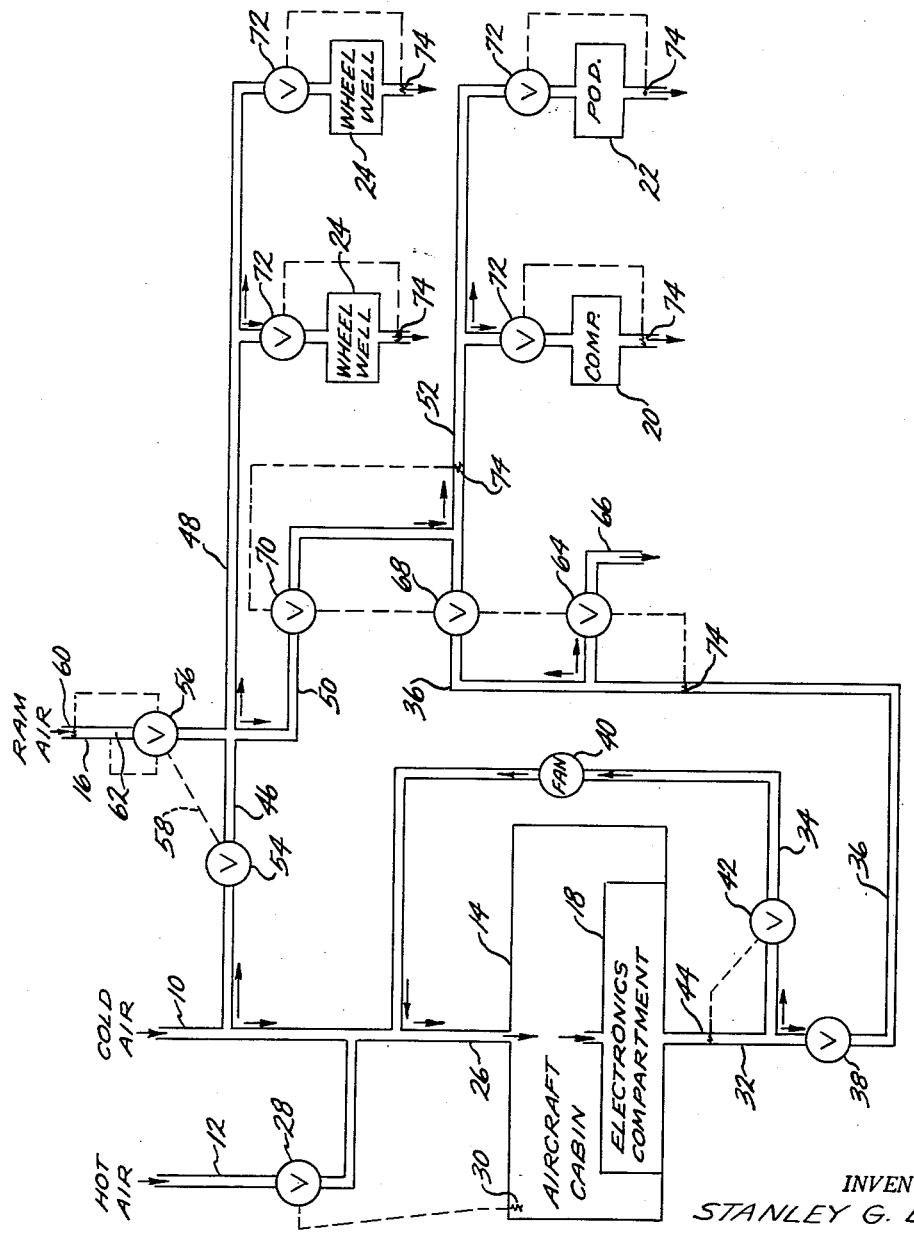

2,953,078

DISTRIBUTION SYSTEM FOR AIRCRAFT AIR CONDITIONING

Stanley G. Best, Manchester, Conn., assignor to United Aircraft Corporation, East Hartford, Conn., a corporation of Delaware Filed Oct. 7, 1957, Ser. No. 688,506

8 Claims. (Cl. 98—1.5)

This invention relates to improvements in air conditioning and, more specifically, to an improved system for distribution of air to the cabin and various compartments of an aircraft which require air conditioning.

It is the general object of the invention to provide the most efficient system for distributing air for cooling purposes to an aircraft cabin, one or more compartments within the cabin, and to a plurality of compartments and devices disposed externally of the cabin.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing is a schematic illustration of the air conditioning system and of the aircraft components which it serves.

In providing air conditioning for an aircraft, it is a conventional practice to bleed air from the aircraft engine compressor to supply the air conditioning system. A portion of the engine bleed air is refrigerated and the remainder of the engine bleed air is mixed with the cold or refrigerated air before introduction to the aircraft cabin. The present invention has nothing to do with improvements in the manner or means of handling the engine bleed air so that a portion of it is cooled and so that another portion is delivered at a high temperature and, therefore, it is necessary for an understanding of the present invention to show only a cold air supply line 10 and a hot air supply line 12 for the aircraft cabin 14.

Another means for providing pressurized air for an air-conditioning system is to utilize air scoops, etc. for the purpose of delivering ram air to the system. The system of distributing the air provided in accordance with the present invention contemplates the use of ram air introduced through a conduit 16 as well as it contemplates the use of cold air and hot air introduced through the conduits 10 and 12.

In addition to supplying air for conditioning the aircraft cabin 14, the distribution system provided herein supplies air for the cooling requirements of one or more compartments disposed within the cabin such as the compartment 18, and the system also supplies air for the cooling requirements of aircraft compartments and devices externally of the cabin such as one or more compartments 20 which may comprise a compartment of the fuselage, a compartment or pod 22 external of the fuselage, and a plurality of wheel wells 24, 24, which are also externally located.

The necessity of providing temperature and pressure conditioned air to aircraft cabins for the comfort and safety of occupants has long been recognized, and present air conditioning systems and air distribution systems have fulfilled the necessary requirements for cabin air conditioning. However, the necessity to provide cooling air streams to other compartments of the fuselage, to pods or compartments located externally of the fuselage, and to the aircraft wheel wells and the like has only recently arisen with the advent of superspeed aircraft. Without cooling at the compartments and devices external of the cabin, structural damage caused by overheating at high speed flight will result. With the added requirements for air cooling, new problems have been encountered in the design and construction of air distribution systems which will provide the necessary cooling without overloading the air supply system to the point where aircraft engine operating efficiency suffers an unacceptable loss.

The system of air distribution provided in accordance with the present invention is designed to reduce the supply load needed for air conditioning the external compartments and devices in addition to cooling or air conditioning the aircraft cabin. The distribution system provided herein contemplates the use of cold and hot air supplied by the engine compressor for cooling the aircraft cabin and also for cooling the external compartments and devices, but this system also contemplates the use of ram air to supplement and/or to replace the compressor supply for cooling the external compartments in an integrated distribution system.

As will be quite apparent from the drawing, the entire air supply for the cabin is furnished by the engine compressor supply system, the cold air line 10 and the hot air line 12 being connected to a cabin inlet conduit 26. In accordance with conventional practice, a valve 28 is located in the hot air line 12 for modulation or for movement from a fully opened to a fully closed position to introduce the right amount of hot air for mixture with the cold air to provide a desired temperature within the cabin 14. The valve 28 is controlled so as to be positioned automatically responsive to temperature within the cabin. That is, a temperature sensitive or responsive control element 30 is located within the cabin 14 to control a suitable actuator for the valve. If an electrically operable valve 28 is employed, the element 30 may comprise a temperature sensitive resistor or "thermistor" connected in a bridge network so that an unbalance signal from the bridge network can be amplified to operate a solenoid or other electrically operable means in the valve 28. If the valve 28 is pneumatically operated, the temperature sensitive element 30 may comprise a temperature-pressure transducer which controls operation of a pneumatic valve actuator. The present invention does not relate to improvements in temperature sensing means or in valve operating means and, therefore, no specific or detailed showing has been made of such temperature sensing and valve operating means. Furthermore, this disclosure does not include any detailed description of means responsive to pressure for operating valves, and it should be understood that the various temperature and/or pressure operated valves described herein can be considered as standard elements of known construction.

The air admitted to the cabin 14 from its inlet conduit 26 also supplies the compartment 18 or a plurality of such compartments located within the cabin 14 and which must be air cooled. Such compartments may be cabinets or the like containing electronic apparatus which causes heating. The air is discharged from the internal compartment or compartments and from the cabin 14 in a discharge conduit 32. Thus, it will be seen that the cabin 14 and internal compartment 18 are connected in series for flow of a cooling air stream therethrough.

In accordance with the present invention, a portion of the air discharged from the cabin 14 through the conduit 32 may be directed into a conduit 34 for recirculation through the cabin and electronics compartments and a portion of the cabin air discharge may be directed into a conduit 36 for distribution to some or all of the compartments and devices external of the cabin 14 and heretofore identified by the reference numerals 20, 22 and 24. A pressure regulating valve 38 is located in the cabin discharge conduit 32 downstream of the recirculating conduit 34 and is constructed and arranged to provide for flow into the external distribution conduit 36 only when cabin pressure is at or above a preselected level.

It will be observed that the conduit 34 extends from the cabin discharge conduit 32 to the cabin inlet conduit 26 and that a fan 40 or other air moving means such as a jet pump or ejector is disposed in the conduit 34 to force recirculation of at least some of the air discharged from the cabin. Obviously, the air discharged from the cabin will be warmed by passage through the cabin and the electronics compartment so that when the said warmed air is re-introduced to the cabin inlet, it reduces the supply requirement for hot air supplied through the hot air line 12, thereby reducing the load on the engine compressor. While the flow of recirculated air can be substantially constant, preferably means are provided for modulating the recirculated air flow. That is, a valve 42 is preferably disposed in the recirculating conduit 34 to modulate flow therethrough responsive to temperature in the cabin discharge conduit 32, a temperature responsive valve actuating element 44 being located in the cabin discharge conduit 32. By providing the modulating valve 42, a maximum cabin and/or electronics compartment temperature can be maintained by modulating the recirculating flow.

The distribution system for the compartments, etc. which are outside the aircraft cabin is arranged to receive a supply from the cold air line 10 or from the ram air line 16 as well as from the conduit 36 which is connected to the cabin discharge. As shown in the drawing, a conduit 46 is connected with the cold air supply line and it and the ram air supply line 16 are connected to a conduit 48 which extends to the wheel wells 24, 24 and they are also connected to a conduit 50 which is in communication with a conduit 52 extending to the other compartments and pods which are located externally of the cabin 14. A valve 54 is located in the cold air conduit 46 and a valve 56 is located in the ram air supply conduit 16, the said valves being ganged or mechanically interconnected as indicated schematically by line 58 so that when one of the valves is opened the other is closed. Preferably, the valves 54 and 56 are automatically operated responsive to ram air pressure and temperature. That is, a temperature sensing device 60 and a pressure sensitive device 62 are located in the ram air line 16 upstream of the valve 56 and are operatively associated with suitable valve actuating means which will open the valve 56 only when ram air pressure attains or exceeds a preselected minimum level and only when the ram air temperature is at or below a preselected level. Thus, the valve 56 opens to admit ram air to the distribution system to close the valve 54 to the supply of cold air to the distribution system when the ram air is sufficiently cool and at a high enough pressure for the requirements of the distribution system to the wheel wells and various compartments located externally of the aircraft cabin. When the ram air is not sufficiently cool or when it has not attained sufficient pressure, the valve 54 will be opened and the valve 56 closed to supply cold air from the engine compressor cold air supply line 10 for distribution to the wheel wells and external compartments.

It is an important feature of the distribution system of this invention that air discharged from the cabin can be used to supplement the flow from the cold air line or from the ram air line to at least some of the external compartments and devices, and under certain conditions cabin discharge air can be used in lieu of air from the cold air line or from the ram air line. In accordance with this aspect of the invention, the conduit 36 extending from the cabin discharge 32 is connected with the conduit 52 which supplies the external compartment or compartments and the external pod or pods. In further accord with this aspect or feature of the invention, a dump valve 64 is disposed in a discharge conduit 66 connected with the conduit 36, an on-off valve 68 is located in the conduit 36 downstream of the dump valve 64, and an on-off valve 70 is located in the conduit 50. The operation of each of the valves 64, 68 and 70 is related to the operation of the others, and the operation of the valves is dictated by the temperature of the cabin discharge air and by the pressure of the air in the conduit 52 extending to the external compartment or compartments 20 and to the external pod or pods 22. At this point, it is to be observed that while the feed conduit 48 for the wheel wells 24, 24 is shown as connected to be supplied only by air from the cold air line 10 or from the ram air line 16, the said conduit can be connected to the conduit 52 so that the wheel wells will be arranged parallel to the external compartment and external pod for the supply of air.

Preferably, a pressure element or elements 72 is disposed in the conduit 52 to effect the desired automatic operation of the valves 64, 68 and 70 in accordance with and responsive to pressure in the conduit 52 and, preferably, an element or a plurality of elements 74 is disposed in the conduit 36 so as to cause operation of the valves 64, 68 and 70 in accordance with and responsive to the temperature of the air discharged from the cabin. Here again, the particular form and operation of the temperature and pressure sensing elements and the valve actuating means are not a part of the present invention and will not be described, it being understood that manually operable valves could be used and that an operator would adjust the valves as desired after observing temperature and pressure in the conduits 36 and 52, respectively.

Operation of the distributor valves 64, 68 and 70 as dictated by temperature is effected for assurance that the air distributed to the compartments and devices which are external of the aircraft cabin 14 is sufficiently cool to satisfy the cooling requirements of such compartments and devices. Obviously, a maximum temperature for cabin discharge air can be predetermined at a level which will provide for cooling of the external compartments and devices whether the cabin discharge air is the only source of flow to said external compartments and devices or whether it is mixed with air from the cold air line or from the ram air line. Having determined the maximum temperature for cabin discharge air, which is to be used for external distribution, the temperature sensitive element or elements 74 can be preset to effect opening movement of the dump valve 64 and closing movement of the on-off valve 68 whenever the said predetermined temperature level is reached in the cabin discharge air line 36. In other words, whenever the cabin air discharge temperature reaches the predetermined maximum, all of the cabin discharge air is dumped overboard through the conduit 66 except for that portion of the cabin discharge air which is recirculated through the conduit 34.

The operation of the distributor valves 64 and 68 as dictated by the pressure of the air within the distributor conduit 52 is secondary to the operation of those valves as dictated by temperature in the conduit 36 as described above. That is, the valve 64 will be closed and the valve 68 will be opened whenever the pressure within the conduit 52 is at a level below that which is determined to be sufficient for proper cooling of the external compartments and devices, provided, however, that the cabin discharge air temperature is below the previously mentioned predetermined maximum level. Assuming that the cabin discharge air temperature is below the maximum for external distribution, the valve 70 is opened with the valve 68 when the distributor dump valve 64 is closed. Thus, air will be drawn from the cold air line 10 or from the ram air line 16 to supplement cabin discharge air for increasing the pressure in external distribution. As the pressure in the external distributor line 52 increases to an acceptable level, the valve 70 is to be closed so that the air for external distribution will be drawn primarily from the cabin discharge. Under certain anticipated operating conditions, the entire supply for external distribution will be received from the cabin supply whereby the valve 70 will be fully closed to reduce or eliminate the drain from the cold air line 10 or from the ram air line 16, thus further enhancing overall aircraft operating efficiency. It is also anticipated that under certain conditions of aircraft operation the valve 70 will be closed and the valve 68 opened while the dump valve 64 can be partially opened, such conditions arising when the cabin discharge air pressure is more than is needed for external distribution.

It will be observed that in the embodiment of the invention shown in the drawing, the feed line or distribution line 48 to the wheel wells 24, 24 is supplied with cold air from the cold air supply conduit 10 or with ram air from the ram air supply conduit 16 at all times and irrespective of the position and operation of the valves 64, 68 and 70. That is, the feed line 48 is connected at the union of the conduit 46 which interconnects the cold air supply line and the ram air supply line on the upstream side of the valve 70. Thus, the wheel wells 24, 24 are not arranged to be supplied at any time with air discharged from the cabin.

In an alternative form of air distribution system falling within the scope of this invention, the feed line 48 to the wheel wells 24, 24 can be connected with the feed line 52 for the compartments and pods 20 and 22 on the downstream side of the valves 68 and 70. In this alternative form of construction, the wheel wells will be in parallel relationship with the compartments 20 and the pods 22 and will be arranged to receive cabin discharge air as well as cold air or ram air.

It should also be observed that a valve 72 is preferably provided at the inlet for each wheel well, compartment and pod to shut off the air supply thereto. Preferably, each valve 72 is constructed and arranged to be closed at a preselected temperature when air cooling is not needed. A temperature sensitive element 74 associated with a suitable actuator for each valve 72 to control operation thereof may be located within the wheel well, compartment, or pod being served or at a discharge port therefore as shown.

The invention claimed is:

1. An air distribution system for air conditioning an aircraft having a cabin and at least one compartment external of the cabin which requires a cooling air stream, the said system comprising a cold air supply conduit connected with the cabin, a ram air supply conduit connected with the compartment, a connecting conduit between the cold air and ram air conduits, a valve in the connecting conduit and a valve in the ram air conduit on the upstream side of the connecting conduit which valves are operable to provide selective air supply from cold air and from ram air for the compartment, a second valve in the ram air conduit downstream of the connecting conduit, a cabin air discharge conduit connected between the cabin and said compartment, and a valve in said discharge conduit, the valve in the discharge conduit and the second valve in the ram air conduit being operable to select cabin discharge air and air in the ram air conduit for supply to the compartment.

2. An air distribution system for air conditioning an aircraft having a cabin and at least one compartment external of the cabin which requires a cooling air stream, the said system comprising a supply conduit for the cabin which is connectible with a pressurized source of air, a ram air supply conduit connected with the compartment, a valve in the ram air conduit, a cabin air discharge conduit connected between the cabin and the compartment, a valve in the said discharge conduit, the said valves being operable to select cabin discharge air and ram air for supply to the compartment, and a recirculating conduit connected between said discharge conduit and the supply conduit for the cabin and including means for causing air flow from the discharge conduit to the cabin supply conduit.

3. An air distribution system for air conditioning an aircraft having a cabin and at least one compartment external of the cabin which requires a cooling air stream, the said system comprising a cold air supply conduit connected with the cabin, a ram air supply conduit connected with the compartment, a connecting conduit connected with the compartment, a connecting conduit between the cold air and ram air conduits, a valve in the connecting conduit and a valve in the ram air conduit on the upstream side of the connecting conduit which valves are operable to provide selective air supply from cold air and from ram air for the compartment, a second valve in the ram air conduit downstream of the connecting conduit, a cabin air discharge conduit connected between the cabin and said compartment, a valve in said discharge conduit, the valve in the discharge conduit and the second valve in the ram air conduit being operable to select cabin discharge air and air in the ram air conduit for supply to the compartment, and a recirculating conduit connected between the discharge conduit and the cold air supply conduit and including means for causing air flow from the discharge conduit to the cold air supply conduit.

4. An air distribution system for air conditioning an aircraft having a cabin and at least one compartment external of the cabin which requires a cooling air stream, the said system comprising a cold air supply conduit connected with the cabin, a ram air supply conduit connected with the compartment, a connecting conduit between the cold air and ram air conduits, a valve in the connecting conduit and a valve in the ram air conduit on the upstream side of the connecting conduit which valves are coordinated so that when one is opened the other is closed whereby to provide selective air supply from the cold air and from the ram air for the compartment, a second valve in the ram air conduit downstream of the connecting conduit, a cabin air discharge conduit connected between the cabin and the compartment, and a valve in said discharge conduit, the valve in the discharge conduit and the second valve in the ram air conduit being operable to select cabin discharge air and air in the ram air conduit for supply to the compartment.

5. An air distribution system for air conditioning an aircraft having a cabin and a plurality of compartments external of the cabin all of which require a cooling air stream, the said system comprising a supply conduit for the cabin which is connectible with a pressurized source of conditioned air, a ram air supply conduit, a first feed conduit for some of said compartments connected with said ram air conduit, a second feed conduit for other of the said compartments connected with said ram air conduit, a valve in the ram air conduit between said first and second feed conduits, a cabin air discharge conduit connected between said cabin and said ram air conduit on the downstream side of the said valve, and a valve in said discharge conduit, the said valves being operable to select cabin discharge air and ram air for supply to the said other compartments.

6. An air distribution system for air conditioning an aircraft having a cabin and a plurality of compartments external of the cabin which require a cooling air stream, the said system comprising a cold air supply conduit connected with the cabin, a ram air supply conduit, a connecting conduit between the cold air and ram air conduits, a valve in the connecting conduit and a valve in the ram air conduit on the upstream side of the connecting conduit which valves are operable to provide selective air supply from cold air and from ram air in the ram air conduit, a first feed conduit for some of the compartments connected with the ram air conduit on the downstream side of the valve therein, a second feed conduit for other of the compartments connected with the ram air conduit on the downstream side of the valve therein, a second valve in the ram air conduit between said first and second feed conduits, a cabin air discharge conduit connected between the cabin and the ram air conduit on the downstream side of the said second valve, and a valve in said discharge conduit, the valve in the discharge conduit and the second valve in the ram air conduit being operable to select cabin discharge air and air in the ram air conduit for supply to the said other compartments.

7. An air distribution system for air conditioning an aircraft having a cabin and a plurality of compartments external of the cabin all of which require a cooling air stream, the said system comprising a cold air supply conduit connected with the cabin, a ram air supply conduit, a connecting conduit between the cold air and ram air conduits, a valve in the connecting conduit and a valve in the ram air conduit on the upstream side of the connecting conduit which valves are constructed and arranged for coordinated operation whereby one valve is opened when the other valve is closed, a first feed conduit for some of the compartments connected to the ram air conduit on the downstream side of the valve therein, a second feed conduit for other of the compartments connected to the ram air conduit on the downstream side of the said valve therein, a second valve in the ram air conduit between said first and second feed conduits, a cabin air discharge conduit connected between the cabin and the said ram air conduit on the downstream side of the second valve therein, a valve in said discharge conduit, the valve in the discharge conduit and the second valve in the ram air conduit being operable to select cabin discharge air and air in the ram air conduit for supply to the said other compartments, and a recirculating conduit connected between said discharge conduit and the cold air supply conduit and including means for forcing air flow from said discharge conduit to said cold air supply conduit.

8. An air distribution system for air conditioning an aircraft having a cabin and at least one compartment external of the cabin which requires a cooling air stream, the said system comprising a cold air supply conduit connected with the cabin, a ram air supply conduit connected with the compartment, a connecting conduit between the cold air and ram air conduits, a valve in the connecting conduit and a valve in the ram air conduit on the upstream side of the connecting conduit which valves are operable to provide selective air supply from cold air and from ram air for the compartment, a cabin air discharge conduit connected between the cabin and the said compartment, and a valve in said discharge conduit, the valve in the discharge conduit being operable to select cabin discharge air for supply to the compartment.

References Cited in the file of this patent

UNITED STATES PATENTS

| | | |
|---|---|---|
| 2,208,554 | Price | July 16, 1940 |
| 2,463,487 | Widgery et al. | Mar. 1, 1949 |
| 2,772,621 | Arnoldi | Dec. 4, 1956 |
| 2,814,241 | Silver | Nov. 26, 1957 |